United States Patent Office 3,531,268
Patented Sept. 29, 1970

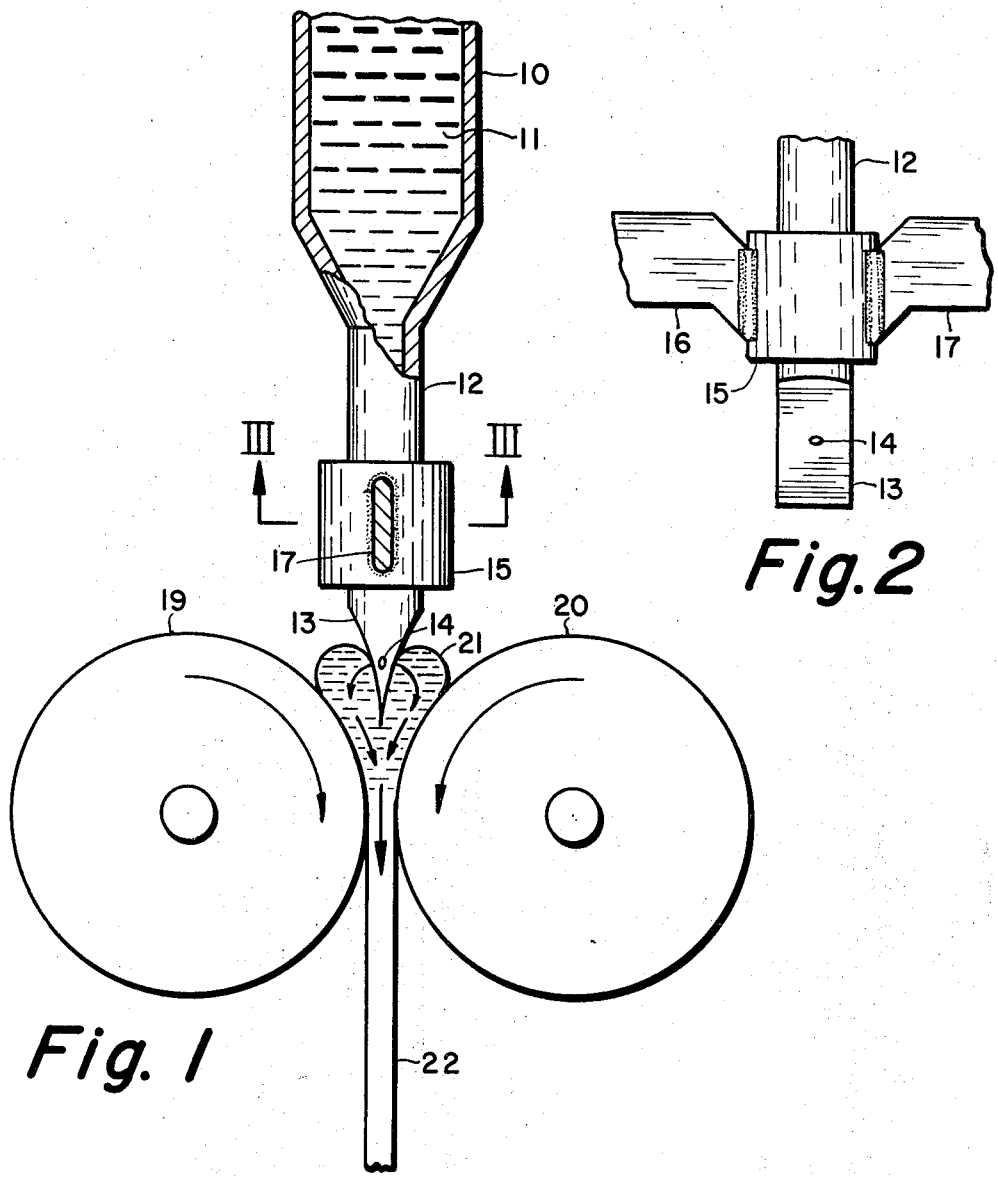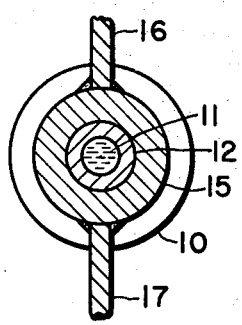

3,531,268
HEATED DELIVERY TIP FOR LIQUID GLASS
Richard E. Allen, Corning, N.Y., assignor to Corning Glass Works, Corning, N.Y., a corporation of New York
Filed Nov. 8, 1966, Ser. No. 592,833
Int. Cl. C03b 25/00, 5/26
U.S. Cl. 65—12                    5 Claims

ABSTRACT OF THE DISCLOSURE

Apparatus for forming thin, vitreous glass ceramic ribbon from a readily devitrifiable glass having high surface tension and low viscosity. The apparatus comprises a hollow resistance heater surrounding and in contact with a delivery tube having a pointed end which terminates at the bite of the forming rollers.

---

By glass ceramic is meant a material that is melted and formed as a glass and then converted to a substantially crystalline state by a process of controlled devitrification. Vitreous glass ceramic refers to glass ceramic in its glassy state before crystallization, while crystalline glass ceramic refers to glass ceramic in its devitrified state. Readily devitrifiable materials are those materials which readily, and often quickly crystallize during thermal processing. Such materials are described by Andrew Herczog and S. Donald Stookey in U.S. Pat. No. 3,195,030, granted July 13, 1965 and assigned to the assignee of the present invention. Representative compositions are shown in the above-identified patent, and include the barium titanates, lead-barium-strontium niobates and the like. Such compositions may be broadly described as members of the family of oxygen-octahedra ferroelectric compounds containing at least one glass forming oxide.

Under ordinary circumstances it is desirable that vitreous glass ceramic be converted to the crystalline state, and good use is made of this phenomenon. However, there are certain circumstances wherein it is desired to maintain a glass ceramic in a vitreous state, even after melting, forming and cooling. One such instance is the particularly difficult formation of substantially continuous thin, vitreous glass ceramic ribbon. Such ribbon may be used as the dielectric material in stacked electrical capacitors, as image orthicon targets, and the like.

It has been customary in the past to roll form glass sheet or ribbon from materials such as ordinary soda-lime window glass by means of the ring-roll process, the upward vertical rolling process, or the continuous horizontal process. In these processes the viscosity of molten glass fed to the rollers is normally about several thousand poises, and the ribbon or sheet so informed is usually between about one-eighth and one inch in thickness. The above enumerated methods are completely inadequate and unsatisfactory for producing ribbon having a thickness between about one mil and ten mils, particularly from materials having a relatively low viscosity, i.e. a viscosity below about ten poises and a high surface tension.

When roll forming low viscosity glasslike materials, such as the readily devitrifiable or thermally crystallizable low viscosity barium titanate glasses or lead-barium-niobate glasses, problems are encountered which are peculiar to such glasses. Due to the relatively high surface tension of such glasses in their molten state, they have a tendency to break up and form a plurality of droplets when in free fall, and it is therefore extremely difficult to deliver a continuous molten stream to the bite of the forming rollers at the relatively low flow rate which must be utilized. Furthermore, due to the readily devitrifiable nature of such glasses, the amount and duration of glass contact with the surface of the rollers before entering the bite must be maintained at a minimum, and the temperature of the vitreous glass ceramic material being delivered to the rollers must be accurately controlled.

Due to the physical properties of the above mentioned glass ceramic materials, they must be heated to about 1500° C. in a suitable furnace or crucible, and the temperature should be maintained at about this level while the material is being delivered to the forming apparatus. One known method for heating a delivery tube is to weld current conducting electrodes thereto. The temperature of the tube can be controlled by regulating the current supplied thereto. However, at the high temperatures required to flow the glass through the delivery tube, glass may leak from the tube at the point of the weld after only a relatively short period of operation. This problem could possibly have been caused by pin holes which were opened during the welding operation or thermal stresses caused by the high operating temperature.

It is therefore an object of this invention to provide a delivery tube for molten glass ceramic material which overcomes the disadvantages associated with prior art delivery tubes.

Another object of this invention is to provide an apparatus for delivering molten glass of a readily devitrifiable nature to a forming device without devitrification thereof.

Another object of this invention is to provide a resistance heated delivery tip which can withstand the thermal shock which accompanies the use thereof at high operating temperatures.

Still another object of this invention is to provide a resistance heated glass delivery tip which is more durable than those of the prior art.

A further object of this invention is to provide an easily replaceable resistance heated delivery tip.

Briefly, this invention relates to an improved resistance heated delivery tip which overcomes the above noted limitations and problems of the prior art. The current conducting tabs are attached to resistance heating means which surrounds the delivery tip.

A number of advantages accrue from this design. Since the current conducting tabs are not welded to the delivery tube, no glass leaks from the tube as in the above mentioned design. Replacement of delivery tubes is simplified since a used tube may be removed and a new one inserted therefor without any additional welding. Since the delivery tube is free to move with respect to the current conducting leads, thermal stresses at this point are reduced.

These and other objects and advantages of my invention will be more apparent to those skilled in the art from the following description and accompanying drawing in which:

FIG. 1 is a side elevation view, partially in section, of an embodiment of this invention disclosing the relationship between the delivery tube, the resistance heating means and the forming rollers;

FIG. 2 is a front view of the resistance heating means in accordance with this invention; and FIG. 3 is a cross sectional view taken along lines III—III of FIG. 1.

Referring now to the drawings, there is shown a delivery tube 10 which is adapted to be connected to a furnace or crucible (not shown) which provides the delivery tube with a source of molten glass ceramic material 11. The end of the delivery tube 10 tapers into a smaller portion 12, the end of which terminates in a knife-edge delivery tip 13. In this embodiment there are four holes 14 in the knife-edge delivery tip, one being in each of the four sides thereof. Surrounding the delivery tube portion 12 is a hollow cylindrical resistance heater 15 to which is welded or otherwise attached a pair of current conducting leads 16 and 17. The tube 12 fits within the cylindrical heater 15 as tightly as possible while still permitting the easy removal and insertion thereof. The bite of a pair of cooperating rollers 19 and 20 is located adjacent the knife-edge portion of the delivery tip. Liquid glass ceramic material which emanates from the holes 14 forms a pool 21 at the bite of the rollers 19 and 20. The rollers are continuously rotated by any well-known variable drive means, in the direction of the arrows shown in FIG. 1 to withdraw molten material at a desired rate from the pool 21 to continuously form a ribbon 22.

The following specific embodiment of this invention, which is not intended to be limiting in nature, is set forth solely as an illustrative example so that those skilled in the art may more readily understand and practice the invention. The crucible (not shown) is filled with approximately two pounds of batch material which causes the temperature of the crucible to drop for a period of time. Heat is applied to the crucible in any well known manner and after approximately thirty minutes, the temperature is restored to 1500° C. The batch is mixed for approximately fifteen minutes. After the crucible reaches the proper temperature, the current through the electrodes 16 and 17 is increased to about 600 or 700 amps, and at the same time an oxygen-hydrogen flame is applied to the tip. The heat from this flame in addition to that due to the high current causes the glass to flow from the holes 14 in the tip. When the flow begins, the crucible is evacuated to restrict the flow and make it controllable. Apparatus for controlling the flow by regulating the pressure in the crucible is described in U.S. Pats. Nos. 3,186,817 and 3,266,881 granted to T. Novack and T. Novack et al. respectively, which are assigned to the assignee of the present invention. After the flow begins the flame is removed and the current through the tip heating cylinder 15 is reduced to a value which maintains the proper temperature at the tip. The proper flow is then rolled between the rollers to form a continuous ribbon. The rollers are water cooled by any well known means such as that disclosed in the Danner patent, No. 2,225,369. As hot streaks or stoppages of the flow due to the cooling occur, the tip current is adjusted accordingly. A run takes approximately 12 minutes.

The delivery tube, the electrodes and the resistance heating cylinder 15 may be made from platinum, a platinum-rhodium alloy or some other suitable high temperature material. A preferred material is an alloy consisting of 80% platinum and 20% rhodium.

The glass ceramic material easily wets a tip made of this material and may even flow upward from the holes 14. The entire tip of the delivery tube becomes wet with the molten glass which would then fall therefrom in droplets except for the fact that the knife-edge tip is situated so close to the bite of the rollers that a uniform flow is delivered to the rollers. The above described arrangement does not permit the glass to cool appreciably during delivery until it contacts the rollers, thus preventing devitrification of the glass.

Ribbon formability was found to be related to the temperature of the glass at the delivery tip, the formability being better at lower temperatures. However, the tip must be maintained at a minimum temperature for the glass to flow. When the glass initially begins to flow due to the high current in the resistance heating electrodes and the oxygen-hydrogen flame, the temperature is too high for good ribbon forming operation, and it must therefore be lowered. The flame is removed and the current is decreased. For the temperature to be adequately lowered, some heat should be conducted from the delivery tube by the electrodes 16 and 17. The tube 12 is slidably mounted within the cylinder 15, but it fits snugly therein so that this heat conduction can take place. By controlling the current through the tip heater, one really controls the heat loss at the tip and thereby assures a uniform flow of glass at an optimum forming temperature.

Since the electrodes are welded to a separate cylinder through which the delivery tube is inserted rather than being welded directly to the delivery tube, weld quality becomes less critical and glass leaks in the delivery tube have been virtually eliminated. The replacement of old delivery tubes is facilitated since the electrodes are not welded to the tube, and the cylindrical resistance heater 15 is adjustable in height, thus aiding in the operation of the forming apparatus.

What is claimed is:

1. An apparatus for controlling the temperature of molten glass being delivered at an extremely high temperature to a utilization device comprising: a delivery tube through which said glass flows, a hollow cylindrical resistance heater surrounding said delivery tube, said heater being slidably mounted with respect to said delivery tube and in heat conducting contact therewith, and electrode means comprising flat, fin-like conductors attached to opposite sides of said resistance heater for conducting heat away from said delivery tube as well as delivering electric current to said resistance heater.

2. An apparatus in accordance with claim 1 wherein said delivery tube has a knife-edge tip having openings near the end thereof.

3. An apparatus for forming molten vitreous glass ceramic material into a ribbon comprising: a delivery tube through which said molten material flows, said delivery tube having an end from which said molten material flows; forming means situated adjacent said end of said delivery tube; resistance heating means surrounding said delivery tube, said heating means being slidably mounted with respect to said delivery tube and being in heat conducting contact therewith; and electrode means comprising flat, fin-like conductors attached to opposite sides of said resistance heating means for conducting heat away from said delivery tube as well as delivering electric current to said resistance heating means.

4. An apparatus in accordance with claim 3 wherein said forming means comprises a pair of cooperating rollers, and said delivery tube end terminates in a knife-edge tip having a plurality of openings therein, said knife-edge being situated near the bite of said rollers.

5. An apparatus in accordance with claim 4 wherein a weld connects said electrode means to said resistance heating means.

References Cited

UNITED STATES PATENTS

| | | | |
|---|---|---|---|
| 469,454 | 2/1892 | Rogers | 65—327 XR |
| 1,622,666 | 3/1927 | Peiler | 65—327 |
| 1,692,702 | 11/1928 | Reece | 65—186 XR |
| 1,905,849 | 4/1933 | Gelstharp | 65—185 XR |
| 2,133,235 | 11/1938 | Slayter | 65—12 XR |
| Re. 21,863 | 7/1941 | Slayter | 65—12 XR |
| 2,323,000 | 6/1943 | Auwarter et al. | 65—12 XR |
| 2,377,772 | 6/1945 | Fletcher et al. | 65—12 XR |
| 3,078,695 | 2/1963 | Kozak et al. | 65—128 XR |
| 3,227,537 | 1/1966 | Novack | 65—128 XR |
| 3,275,429 | 9/1966 | Javaux | 65—185 |

FRANK W. MIGA, Primary Examiner

U.S. Cl. X.R.

65—324, 326, 333, 374